United States Patent [19]

Smith

[11] 3,714,303
[45] Jan. 30, 1973

[54] DEODORIZATION OF PHOSPHORODITHIOATES

[75] Inventor: Lowell R. Smith, Chesterfield, Mo.

[73] Assignee: Monsanto Company, St. Louis, Mo.

[22] Filed: May 3, 1971

[21] Appl. No.: 139,855

[52] U.S. Cl..................................260/989, 260/942
[51] Int. Cl................................................C07f 9/16
[58] Field of Search......................................260/989

[56] References Cited

OTHER PUBLICATIONS

C.A., Vol. 61, (1964) page 4905 b-d

Primary Examiner—Joseph P. Brust
Attorney—Paul C. Krizov, Neal E. Willis and Robert C. Griesbauer

[57] ABSTRACT

Malodorous phosphorodithioate compounds are deodorized by contacting said compounds with zinc oxide. Representative of the class of compounds deodorized in accordance with this invention is the insecticide malathion.

5 Claims, No Drawings

DEODORIZATION OF PHOSPHORODITHIOATES

This invention relates to a novel process for the removal of offensive odors and stabilization of malodorous phosphorodithioate compounds. More particularly, the invention relates to a process for the deodorization and stabilization of sulfur containing phosphate pesticides of the class derived from dithiophosphoric acid.

A preferred class of malodorous phosphorodithioate pesticides which are upgraded in accordance with this invention can be represented by the formula

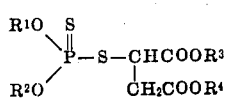

wherein $R^1$ and $R^2$ are each selected from the group consisting of aliphatic and aromatic hydrocarbon radicals and $R^3$ and $R^4$ are each selected from the group consisting of hydrogen, aliphatic and aromatic hydrocarbon radicals. The preparation of these phosphorodithioate pesticides is well known. The phosphorodithioate compounds can be prepared by the reaction of a dithiophosphoric acid with an olefinic acid or ester or by the one step reaction of an alcohol, phosphorus pentasulfide and an olefinic acid or ester. The details of the preparation of these phosphorodithioate compounds are more fully set forth in U.S. Pat. Nos. 2,578,652 and 2,863,902, the teachings of said patents being incorporated herein by reference.

The above described phosphorodithioate compounds are recognized in the art as highly beneficial insecticides having relatively low mammalian toxicity. A typical compound is 0,0-dimethyl-S-(1,2-dicarbethoxyethyl)-phosphorodithioate an insecticide commercially available as malathion. Such insecticides are useful for the control of aphids, grasshoppers, weevils, spider mites, houseflies and a wide range of other crop, livestock and household insects. The offensive odor of the technical phosphorodithioate compounds is objectionable and hampers their use particularly in closed quarters such as barns, warehouses and dwellings. Numerous methods and means have been employed to reduce the malodors of these compounds. Some of the methods used to deodorize phosphorodithioate compounds include the use of various oxidizing substances. Such methods are not completely satisfactory and are difficult, costly and time consuming usually requiring several additional steps. Means for masking the malodors of these compounds with odorants such as spice or pine scents are costly and are not effective in stabilizing the odor of the packaged phosphorodithioate pesticides and often the masking odorant is found objectionable for general use.

It has now been found that the offensive odor, characteristic of these phosphorodithioate compounds, can be conveniently and effectively reduced or removed by contacting the compound with zinc oxide.

The phosphorodithioate compound treated with zinc oxide is characterized by a mild ester-like odor substantially free of offensive odors. The treatment of the phosphorodithioate pesticides with zinc oxide provides a product having a pleasant odor which can be used to advantage, for example, in fly sprays and household sprays which are not repugnant to the applicator and are free of the malodors present in the crude or technical grade of the phosphorodithioate pesticide. The treatment of phosphorodithioate pesticides in accordance with this invention provides products which are highly effective against a host of insects and substantially free of offensive odors found objectionable by householders, gardeners and others. In addition to removing the malodors of the phosphorodithioate compounds, the practice of this invention provides a method of stabilizing the product in that the characteristic malodors do not reform after prolonged storage.

Various techniques can be employed to obtain the advantages of this invention. For example, zinc oxide can be added to technical malathion with sufficient mixing to provide substantial contact of the malathion with the particulate zinc oxide. Recovery of the malathion free of the zinc oxide by conventional methods such as filtration provides a product which is substantially free of malodors. This zinc oxide treatment of the phosphorodithioate compound can be conveniently incorporated into the conventional process for producing the desired phosphorodithioate. For example, in the production of malathion, the product is usually filtered to remove solid by-products arising from the reaction and the washing of the product with alkali solutions. Thus, the invention can be conveniently practiced by the addition of zinc oxide to the reaction mixture after the washing step and prior to filtering the product. A particular advantageous procedure useful in the practice of this invention is to filter production malathion through a filter bed containing zinc oxide. In this manner, no additional steps are added to the manufacturing procedure, the solid by-products are removed and a product substantially free of offensive odors is obtained. The resultant product is also characterized in that offensive odors do not redevelop in the product during storage.

The deodorization of phosphorodithioate compounds by contacting the compound with zinc oxide can also be readily practiced subsequent to the production of the compound. For example, insecticide formulators can filter technical malathion through a bed comprising zinc oxide prior to adding it to other insecticidal agents, solvents, adjuvants and the like, to prepare a ready to use formulation free of offensive odors characteristic of malathion.

In the practice of this invention, the phosphorodithioate compound can be contacted with zinc oxide within a broad temperature range, for example, from about 5° to about 110° C. Usually the temperature is within the temperature range conventionally found under the process conditions when this method is incorporated into the production of the phosphordithiate compound. When the invention is practiced to upgrade technical phosphorodithioate compounds subsequent to production, the preferred temperature range is from about 20° to about 35° C.

The zinc oxide useful in the practice of this invention is commercially available and can be rubber grade, paint grade, pharmaceutical or other grades of particulate zinc oxide. When the preferred method of deodorizing phosphorodithioate compounds by filtering the compound through a bed comprising zinc oxide is employed, consideration is given to the packing characteristics of the particulate zinc oxide in respect to the characteristics of the inert filter bed materials. Additional filter aids can be employed in the filter bed to enhance the flow-through rate. Of course, other conventional expedients such as pressure, vacuum or centrifugal force can also be employed to improve the process.

The amount of zinc oxide employed to deodorize the phosphorodithioate compound depends upon the particular phosphorodithioate, the quality of the starting reactants and the process conditions. Generally, an amount of from about 0.1 to about 3.0 percent or more based on the weight of the phosphorodithioate is usually adequate to effectively deodorize the phosphorodithioate Of course, excessive amounts while effective are uneconomical and lesser amounts while removing some of the offensive odors will not provide a product completely free of malodors.

When employing the preferred method using a filter bed, the bed generally comprises from about 1 to about 10 parts by weight zinc oxide and from about 1 to about 10 parts by weight of other filter bed materials including filter aids. Such a filter bed can be employed to deodorize substantially quantities of phosphorodithioate compounds. Exhaustion of the deodorizing effect of the zinc oxide in the filter bed can be readily determined by the presence of malodors in the filtrate. At such time the filter bed is replaced or rejuvenated with additional zinc oxide. Those skilled in the filtration art can readily ascertain the optimum filter bed characteristics which, of course, depend upon the physical properties of the phosphorodithioate, the process conditions and equipment.

Further details and advantages of this invention are illustrated by example.

Approximately equal parts by weight of reagent grade zinc oxide and attapulgite granules having a mesh size U.S.S. within the range 24 to 48 were blended together to form a suitable filter bed material. About 5 parts by weight of this filter bed material were placed on a porous substrate and about 100 parts by weight of technical malathion were filtered through and collected in a glass container. The collected malathion filtrate was characterized by fragrant pleasant odor substantially free of offensive odors characteristic of the technical malathion.

The collected malathion treated in accordance with the foregoing example was evaluated by an odor panel consisting of 10 evaluators and also analyzed by gas-liquid chromatography (GLC) for the presence of mercaptan.

The odor panel compared the treated sample with that of deodorized malathion available commercially under the designation premium grade.

Each member of the odor panel evaluated the treated sample for the presence of malodors and compared the odor to that of the control using a standardized procedure. The odor of the treated sample and that of the control was noted immediately upon uncapping the sample and again one minute after the cap had been removed, thus, allowing for an exchange of air in the vapor space above the sample. Using the above procedure no malodors were detected in the treated sample. All of the evaluators rated the treated sample equal to or better than the control, five evaluators indicating the treated sample to be better than the control.

A sample of the malathion treated in accordance with the above example was stored in a closed container having a vapor space above the treated malathion equal to approximately 75 percent of the total volume of the container. The vapor space was analyzed for the presence of methyl mercaptan using standard gas-liquid chromatography techniques.

GLC analysis of the vapor space above the treated malathion showed the absence of methyl mercaptan. The vapor space was analyzed again after a storage period of 3 and 6 weeks and was found to be free of methyl mercaptan. This procedure demonstrates that malathion treated in accordance with this invention is free of the offensive odors and stabilized against the recurrence of offensive odors for for substantial storage periods.

The methods of this invention are highly advantageous in that the methods are very adaptable to convention procedures utilized to manufacture the phosphorodithioates and are very economical and effective in deodorizing malodorous phosphoro-dithioate compounds.

Although this invention has been described by the foregoing examples, it will be apparent that various equivalent changes and modifications may be resorted to without departing from the spirit and scope thereof, and it is understood that such equivalent embodiments are intended to be included herein.

The embodiments of the invention in which an exclusive property or privilege is claimed are defined as follows:

1. A process for reducing the offensive odor of a malodorous phosphorodithioate compound of the formula

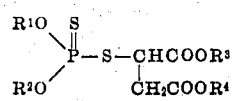

wherein $R^1$ and $R^2$ are each selected from the group consisting of aliphatic and aromatic hydrocarbon radicals and $R^3$ and $R^4$ are each selected from the group consisting of hydrogen, aliphatic and aromatic hydrocarbon radicals which comprises contacting said phosphorodithioate with zinc oxide.

2. A process in accordance with claim 1 wherein the phosphorodithioate is filtered through a bed comprising zinc oxide.

3. A process in accordance with claim 1 wherein the phosphorodithioate is 0,0-dimethyl-S-(1,2-dicarbethoxyethyl)-phosphorodithioate.

4. A process in accordance with claim 3 wherein the phosphorodithioate is filtered through a filter bed comprising zinc oxide.

5. A process in accordance with claim 4 wherein the filter bed consists of from 1 to 10 parts by weight of zinc oxide and from 1 to 10 parts by weight of attapulgite.

* * * * *